Aug. 15, 1967    E. E. SCOTT    3,336,488
OSCILLATING MOTOR

Filed Aug. 3, 1964    6 Sheets-Sheet 1

INVENTOR.
ELMER E. SCOTT
BY Seed & Berry
ATTORNEYS

Aug. 15, 1967     E. E. SCOTT     3,336,488
OSCILLATING MOTOR
Filed Aug. 3, 1964     6 Sheets-Sheet 2

INVENTOR.
ELMER E. SCOTT
BY Seed & Berry
ATTORNEYS

Aug. 15, 1967

E. E. SCOTT 3,336,488

OSCILLATING MOTOR

Filed Aug. 3, 1964

INVENTOR.
ELMER E. SCOTT
BY Seed & Berry

ATTORNEYS

Aug. 15, 1967 E. E. SCOTT 3,336,488
OSCILLATING MOTOR
Filed Aug. 3, 1964 6 Sheets-Sheet 5

INVENTOR.
ELMER E. SCOTT
BY
*Seed & Berry*
ATTORNEYS

Aug. 15, 1967  E. E. SCOTT  3,336,488
OSCILLATING MOTOR
Filed Aug. 3, 1964  6 Sheets-Sheet 6
FIG. 22.
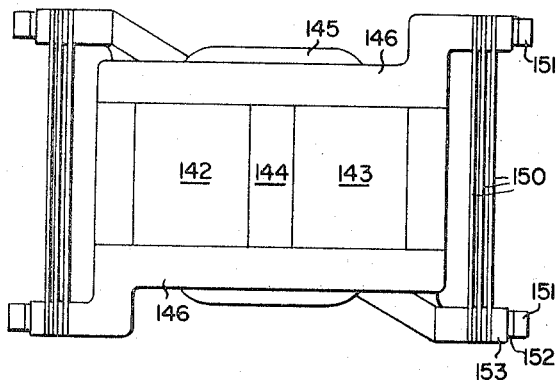
FIG. 24.
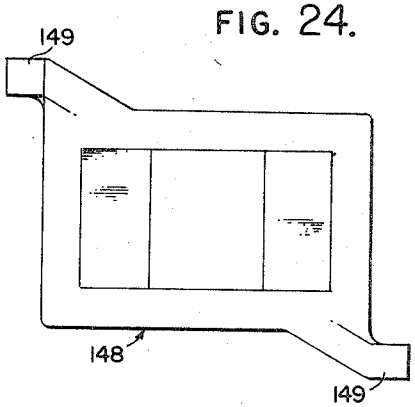
FIG. 23.
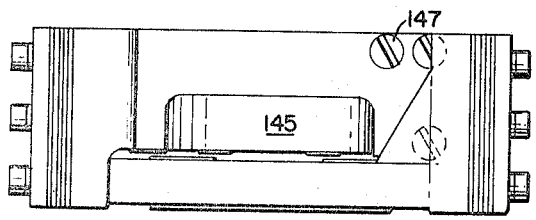
FIG. 26.
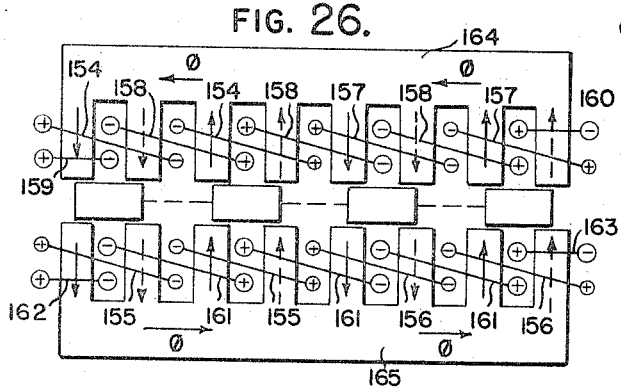
FIG. 25.
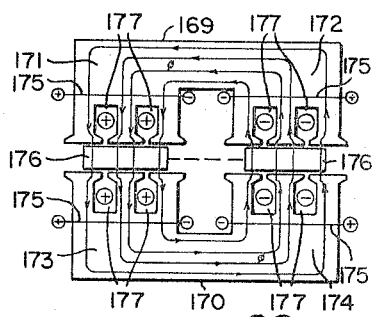
FIG. 27.
FIG. 29.
FIG. 28.
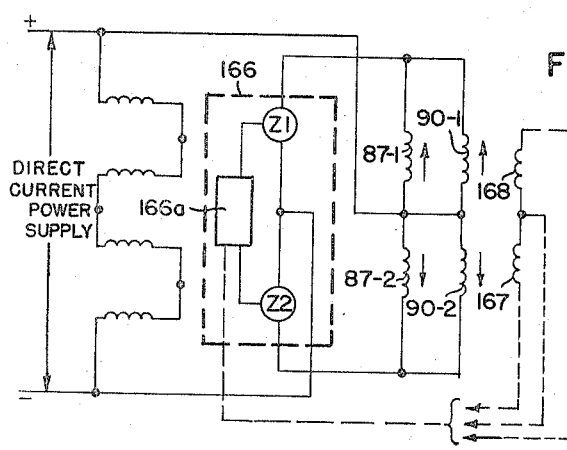
INVENTOR.
ELMER E. SCOTT
BY
*Seed & Berry*
ATTORNEYS

United States Patent Office 3,336,488
Patented Aug. 15, 1967

3,336,488
OSCILLATING MOTOR
Elmer E. Scott, 6602 Olympic Highway,
Aberdeen, Wash. 98520
Filed Aug. 3, 1964, Ser. No. 386,836
5 Claims. (Cl. 310—24)

The present invention relates in general to electrical motors and more particularly to an electrical motor for attaining direct linear oscillating motion with thrust being produced in either direction without the use of complicated mechanical conversions.

Widespread use of tools and machines requiring oscillating linear motion has brought about a need for a motive means to drive such tools and machines directly without complicated mechanical conversions used to adapt the rotating electric motor to them. Where considerable horsepower is required the rotating electric motor has been recognized as the logical motive power, but necessitating some form of power transmission gears, cams, eccentrics or other conversion equipment to change rotation to oscillation for use at the point of power utilization. Where horsepower requirements are relatively small, various forms of vibrating and reciprocating devices have been used but have proven inadequate for meeting the requirements.

Of the many forms of small vibrating motors in existence, most are characterized by the disadvantages of very short stroke and extremely small horsepower output per pound of material. The accompanying electrical characteristics are also far from optimum in that efficiency and the power factor are low and therefor line current is relatively high. Larger forms of vibrating motors have been built which develop somewhat more horsepower but with the same general shortcomings as the smaller units mentioned. In the larger forms, the stroke is limited to about 3/16 inch, the devices are bulky and they require expensive complex auxiliary equipment for their operation. Furthermore, the efficiency and the power factor are poor and line current high as in the case of the smaller unit.

The oscillating motor of the present invention is inherently an alternating current device intended to drive such tools and machines as reciprocating hand sanders, floor sanders, reciprocating saws, sifters, shaker screens, bin vibrators, vibrating conveyors, agitators, impact masonry drills, grass cutters, hedge trimmers, oscillating screens, material feeders and similar machines utilizing oscillating linear motion. Such applications are made possible because the oscillating motor of the present invention exhibits characteristics which make it practical in fractional horsepower ratings and up to integral horsepower ratings with no apparent upper limit. Efficiency and the power factor are comparable to that of widely used rotating equipment such as induction and universal motors. The line current is comparable to that of induction motors of equal capacity.

According to the present invention, the motive means can be designed for strokes far in excess of the maximum stroke of about 3/16" for existing devices. The unique use of a unidirectional magnetic field and a constant air gap construction is responsible for characteristics much improved over those of existing units and provides a new concept in attaining linear oscillating power in a practical manner.

The arrangements described herein, employing the combination of a magnetic field in conjunction with the energizing winding, provide a device which produces thrust in either direction as it operates in synchronism with the power supply, producing one complete oscillation for each cycle of the power supply. The main, or energizing, winding is a simple shunt winding connected directly across the alternating current power supply. The magnetic field may be established by any conventional means. It may be provided by a permanent magnet in which event no excitation power supply is required to maintain the field. The field may be established by an electromagnet energized by either direct current or by rectified alternating current. In the latter case the amount of energy required for excitation is relatively small, ranging from about 1 to 5% of the total capacity of the unit. The excitation requirements vary with the size and type of unit and generally are comparable to those of rotating direct current apparatus.

When the oscillating motor is operated from an alternating current power supply, it will usually be convenient to supply the excitation winding through a rectifier from the alternating current supply used for the energizing winding. Where the motor is operated from a direct current power supply, the excitation can be supplied directly from the source with the energizing winding supplied from an inverter, rotary converter, or any supply of alternating current. Any form of oscillating motor described herein can be operated without modification from a direct current power supply by using a full wave (four element) inverter. With a slight modification of the energizing winding, any form of the motor may be operated from a direct current power source using a bi-phase half wave (2 element) inverter.

The present invention, therefor, provides a simple practical oscillating motor suitable for driving many forms of tools and machines utilizing linear oscillating motion. The present invention also provides a wide range of stroke and horsepower, thus broadening the field of application over that of similar existing forms of motive power.

By omission of items prone toward high maintenance, such as bearings, brushes, commutator, contacts and the like, and with the use of an all stationary coil design and a simple spring suspension system, a device is provided that is an efficient, rugged, simple and practical maintenance-free form of linear oscillating motive power.

A primary object of the present invention is, therefore, to provide an alternating current motive means which produces oscillating linear motion and develops thrust in either direction of operation and which operates in synchronism with the power supply producing one complete oscillation for each cycle of power supply as contrasted with the existing devices which develop thrust in only one direction.

Another object of the present invention is to provide a motive means producing oscillating linear motion that develops thrust by utilizing lateral forces exerted on current carrying conductors in the presence of a unidirectional magnetic field, but where the attractive forces between poles of unlike polarity are not utilized.

Another object of the present invention is to provide a motive means that permits the main or energizing, winding to be connected directly to a conventional alternating current power supply without the need for interposed auxiliary devices of any form, in which contacts, controlled and/or uncontrolled interrupters, electronic tubes or semi-conducting devices and their associated maintenance are no longer necessary.

Another object of the present invention is to provide a linear oscillating motor with all necessary electrical windings supported in the stator; with no windings on the armature, thus making flexible leads or moving contacts to the armature unnecessary.

Another object of the present invention is to provide an oscillating motor in which the armature moves in a direction perpendicular to the axes of the stator pole pieces with the air gap between stator pole pieces and armature poles remaining constant throughout the entire stroke, thus permitting a contant unidirectional magnetic flux in the magnetic circuit irrespective of the length of stroke.

Another object of the present invention is to provide an oscillating motor in which the unidirectional magnetic flux is established by a winding separate from the energizing winding and supplied with a unidirectional current to relieve the energizing winding from supplying the magnetic field which would add a highly lagging component of current to the enerizing winding current required to do work.

Another object of the present invention is to provide an oscillating motor in which the unidirectional magnetic field is furnished by permanent magnets, hence the separate excitation windings and direct current power supply are no longer necessary.

Another object of the present invention is to provide an oscillating motive means which is inherently incapable of producing radio frequency interference of any form.

Another object of the present invention is to provide an oscillating motor that takes a current of essentially sine wave form when energized from an alternating current power supply with sine wave form of commercial quality.

A further important object of the present invention is to provide an oscillating motor with efficiency, power factor and line current that are comparable to those of rotating motors such as induction and universal motors of comparable size.

A further object of the present invention is to provide a motive means producing linear oscillating motion in which the armature may be elastically suspended by springs or the equivalent so as to eliminate the need of bearings, sliding friction or other similar means requiring lubrication and other maintenance.

A further object of the present invention is to provide an oscillating motor in which long strokes and larger armature masses are possible by virtue of the elastic suspension of the armature, where the period of oscillation is determined by the mass of the oscillating part and compliance of the elastic means, and which period of oscillation coincides with that of the electrical power supply so the motor operates in mechanical resonance.

A further object of the present invention is to provide an oscillating motor in which the elastic means for suspending the armature provides accurate alignment of the armature with respect to the stator pole pieces to maintain a constant air gap between armature and stator pole pieces throughout the entire stroke and provides for precise linear motion of the armature with respect to the stator.

A further object of the present invention is to provide for use in an oscillating motor, a cantilever spring of unique shape serving first as an elastic means providing the necessary accelerating forces for reversing the direction of movement of the armature and second as providing accurate alignment of the armature to give a constant air gap throughout the stroke, the extremities of which spring can be mounted directly to the rigid stator frame in spite of the normal variation in distance between these extremities of the spring as it is deflected by the normal motion of the armature.

A further object of the present invention is to provide for use in an oscillating motor, where slight deviation from precise straight line motion with respect to the stator is tolerable, a simple cantilever spring which first, serves as an elastic means providing the necessary accelerating forces and second, provides accurate alignment of the armature in a plane perpendicular to the stator pole piece axes to maintain a constant air gap between armature and stator poles throughout the stroke.

A further object of the present invention is to provide an oscillating motive means providing oscillating linear motion of a certain maximum stroke, which stroke can be varied over a range of zero to maximum by variation of the alternating current voltage applied to the energizing windings.

A further object of the present invention is to provide an oscillating motive means which not only serves to convert electrical energy into oscillating linear motion, but also serves to convert oscillating linear motion into electrical energy, thus serving as an oscillating generator as well as a motor. As an oscillating generator, the device, when driven mechanically from an oscillating power source, will generate one cycle of alternating current for each complete oscillation of the armature.

A still further object of the present invention is to provide an oscillating motor, the embodiments of which are not only suitable for operation on full wave alternating current, but also all forms of which are adaptable, with modification of the energizing winding and the use of a bi-phase half wave (2 element) inverter, to operation on direct current power supplies.

The means by which the foregoing objects and other advantages, which will be apparent to those skilled in the art, are accomplished, are set forth in the following specification and claims, and are illustrated in the accompanying drawings. Reference is now made to the accompanying drawings in which:

FIG. 22 is a plan view of a sixth embodiment of the present invention;

FIG. 23 is a side elevation of the device shown in FIG. 22;

FIG. 24 is a detail view of the armature unit of the sixth embodiment;

FIG. 25 is a schematic illustration of the spring deflection of the sixth embodiment;

FIG. 26 is a diagrammatic illustration of a seventh embodiment of the invention;

FIG. 27 is a circuit diagram for adapting the oscillating motor to a bi-phase half wave inverter for a direct current power supply;

FIG. 28 is a circuit detail illustrating a two coil arrangement of the circuit shown in FIG. 27; and FIG. 29 illustrates an additional form of the invention utilizing a partially closed slot arrangement.

Before describing the specific details of the various embodiments of the present invention, a description of the fundamental principles upon which the operation of the invention depends will be given to enable a clear understanding of the novel concepts involved. The oscillating motive means of the present invention operates on the basic electro magnetic principle which is familiar to those versed in the art of electric motor design and to those familiar with electro magnetic fundamentals. The technical terms necessary to completely explain the operation of the present invention will also be understood by those versed in the art. The electromagnetic principle referred to is that, when a conductor carrying a current is placed in a magnetic field, a force is exerted on the conductor. When the conductor is at right angles to the magnetic flux, the force is at right angles to both the conductor and the magnetic field.

Figure 1:
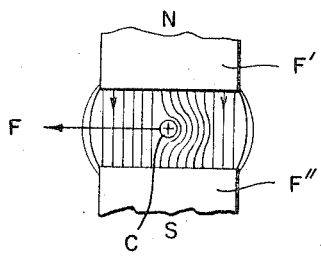
FIGS. 1 and 2 are diagrammatic illustrations of the basic electro magnetic principles of the invention.

The stated principle may be more clearly understood by referring to FIG. 1 of the drawings which illustrates a simple magnetic field between two pole pieces. The direction of magnetic flux is said to be from the north pole toward the south pole. The conductor C is at right angles to the field and carries a current away from the observer with the magnetic field set up about the conductor by the current being in clockwise direction and distorting the field as shown. The field is strengthened on the right as seen in FIG. 1 and weakened on the left with a resulting force F toward the left. It must also be remembered that the vector summation of all the forces in a system must be equal to zero, or be balanced. Therefore, when a force F is exerted to the left of the conductor in FIG. 1, an equal and opposite force is exerted on the magnetic field and pole pieces toward the right. This is shown by two equal components F' and F" whose sum is equal to the force F. Further, the force of the conductor is directly proportional to the flux density of the magnetic field, the length of the conductor in the field and the current in the conductor. This force may be expressed as follows:

*Formula 1*

$$F = \frac{BIL}{10}$$

F=force in dynes
B=magnetic flux density in lines per sq. centimeter
L=length of conductor in centimeters
I=current in amperes While FIG. 1 shows the conductor C in which current flows away from the observer (indicated by the plus sign or the tail of an arrow) producing a force on the conductor to the left, if the current is reversed (flowing toward the observer) indicated by the minus sign, all the forces reverse and the conductor is forced toward the right. In conclusion, it is obvious that, with the magnetic field unchanged, the direction of forces depends upon the direction of current in the conductor and the magnitude of the forces depends upon the magnitude of the current.

Figure 2:
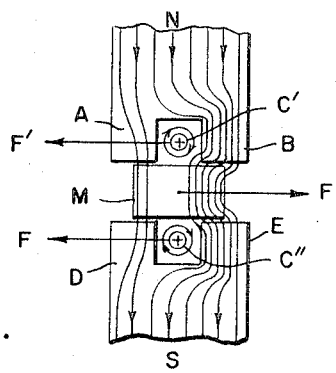

FIG. 2 of the drawings illustrates two pole pieces designated N and S with each pole piece being shaped to contain two teeth and one slot with conductors C' and C" being located in the slots of the pole pieces N and S respectively. The two teeth of the pole piece N are designated A and B and the two teeth of the pole pieces S are designated D and E.

The conductor C' in the slot in pole piece N carries current away from the observer with the resultant flux about the conductor being in a clockwise direction. This causes the magnetic flux in tooth A of the pole piece N to be weakened and the flux to be strengthened in the tooth B. Likewise the current in conductor C", also flowing away from the observer, sets up a clockwise flux which weakens the magnetic flux in tooth D of pole piece S and strengthens the flux in tooth E. FIG. 2 therefore illustrates how current carrying conductors placed in this physical arrangement can serve to divert the magnetic flux to one side or the other of the pole pieces, depending upon the direction of current flow. With current in conductors C' and C" reversed, the flux will be diverted to the opposite side of the poles N and S to flow through teeth A and D.

FIG. 2 also illustrates a segment of magnetic material M (usually iron) added between the pole pieces N and S. With current flowing in conductors C' and C" away from the observer, the magnetic flux is diverted to teeth B and E on the right sides of poles N and S respectively. The forces F' and F" referred to in connection with FIG. 1 are now exerted to the left on conductors C' and C" respectively and also on pole pieces N and S since the conductors are rigidly fixed in the pole pieces. The force F, equal to F' plus F", in the opposite direction is exerted on the armature segment M to the right. As previously explained, a reversal of current in conductors C' and C" will divert the flux to the left teeth A and D of poles N and S, reversing all forces, hence a force F on the armature segment M will exist toward the left when the direction of current is reversed.

The foregoing description presents the basic elements of an electromagnetic structure for producing forces alternately from left to right on an iron segment by introducing an alternating current into conductors C' and C". With pole pieces N and S rigidly fixed and, by suspending the iron armature segment M midway between pole pieces N and S so as to move in a plane perpendicular to the axis of the pole pieces, the forces produced by an alternating current in conductors C' and C" will first divert the magnetic flux alternately from right to left sides of the pole pieces, second, produce forces alternately from right to left which will, thirdly, cause armature segment M to oscillate to the right and left of the center or rest position. From the basic principles described, it is obvious that the oscillating motor of the present invention does not utilize the attractive forces between pole pieces of unlike polarity for its operation as do existing types. It will be noted that, in the conventional rotating type motor, attractive forces do exist between pole pieces but these are not utilized to produce torque. Torque is produced by current carrying conductors in the magnetic field, creating forces at right angles to the main pole piece axes and, likewise, thrust is produced in the oscillating motor of the present invention by similar methods. It will also be noted that, in conventional rotating motors, the air gap remains constant while the direction of motion of the surface of the armature is at right angles to the axes of the pole pieces. Likewise, the air gap in the oscillating motor of the present invention is constant while the direction of motion is at right angles to the axes of the pole pieces. The short air gap is essential to provide a strong magnetic flux in a low reluctance path in which to create maximum forces by the current carrying conductors in that field throughout the entire stroke. In all forms of the oscillating motor described herein, the air gap is constant during the operation. The short air gap that remains constant throughout the stroke is a feature of the oscillating motor of the present invention which results in characteristics comparable to those of the widely used rotating motors such as induction and series motors with respect to efficiency, line current and power factor. The constant air gap feature also permits the oscillating motor to be built in integral horsepower ratings and with strokes much greater than heretofore possible.

Figure 3:
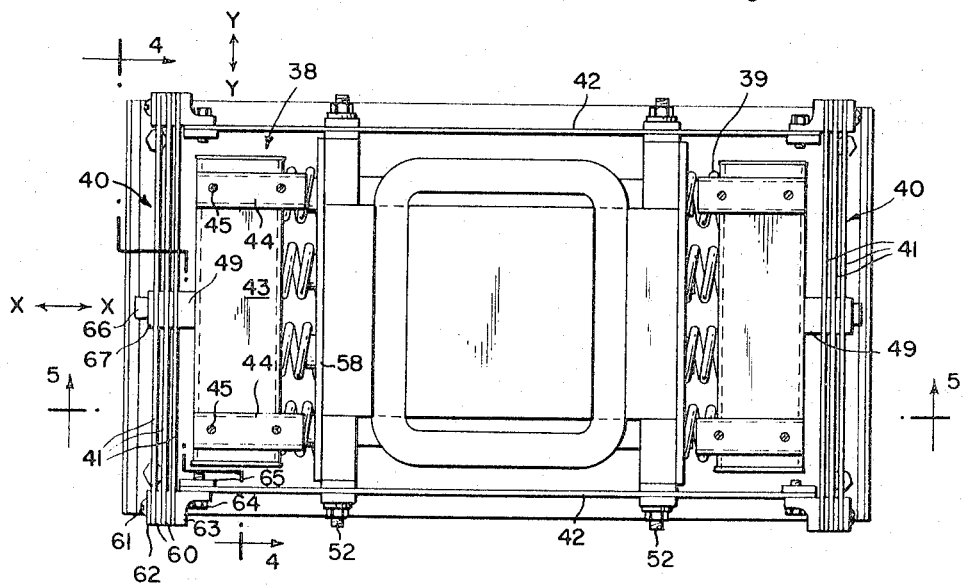
FIG. 3 is a plan view of the first embodiment of the invention taken along lines 3—3 of FIG. 5.
Figure 4:
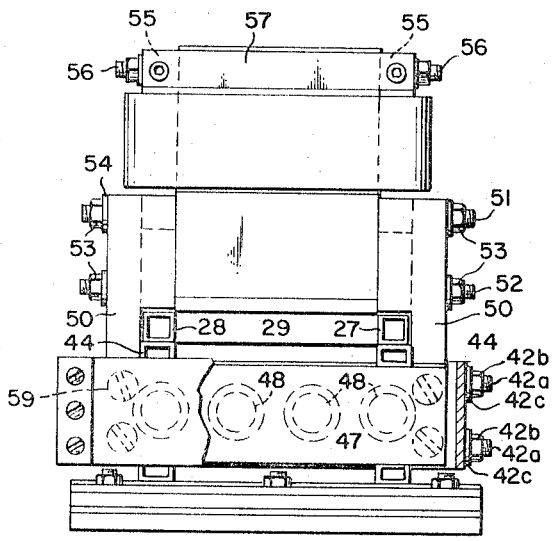
FIG. 4 is an end view of the first embodiment of the invention.
Figure 5:
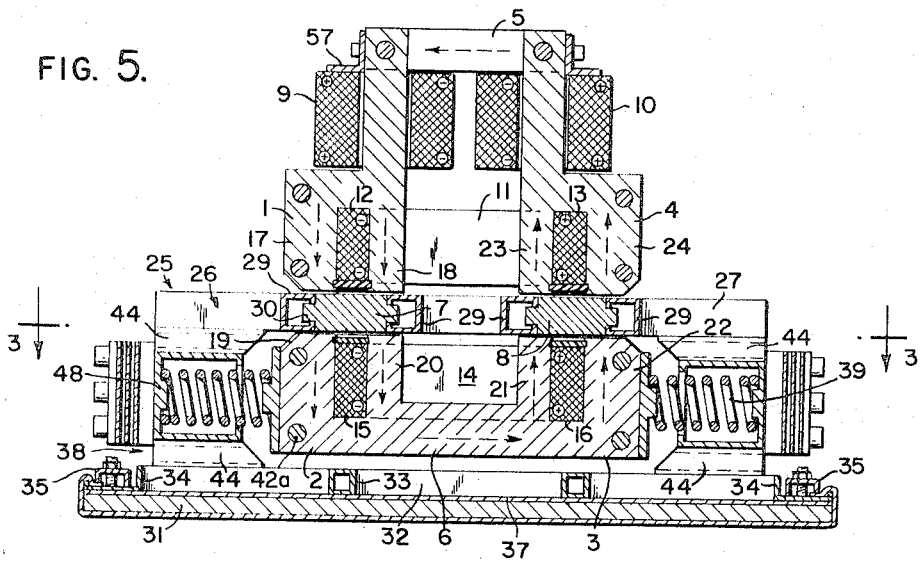
FIG. 5 is a cross section taken along lines 5—5 of FIG. 3.

FIGS. 3 to 5 of the drawings illustrate a first form of a practical application of the concepts of the present invention as applied to a hand sander device by way of illustration. It will be understood that while the embodiment shown in FIGS. 3 through 5 is in the form of a sander, the specific illustration is by way of example only since the oscillating motor structure described may be adapted for operating a multitude of different specific devices. Referring to FIG. 5, the first form of the invention incorporates four slotted pole pieces 1, 2, 3 and 4, an upper connecting yoke 5, a lower yoke 6 and two armature segments 7 and 8. The magnetic field is established by field coils 9 and 10, associated with the pole pieces 1 and 4 respectively, which produce a magnetic flux in a counter-clockwise direction in the magnetic circuit as indicated by the dotted line arrows in the pole pieces, when current flows in the direction indicated in the field coil conductors.

A plurality of conductors are connected in series to form an upper energizing coil 11 in slots 12 and 13 of pole pieces 1 and 4 respectively. A second plurality of conductors are also connected in series to form a lower energizing coil 14 in slots 15 and 16 in pole pieces 2 and 3 respectively. The upper coil 11 and lower coil 14 are connected with like polarity to the alternating current supply so that current in their respective conductors in pole pieces 1 and 4 flows in the same direction as the current in the conductors in the pole pieces 2 and 3.

The two armature segments 7 and 8 are so mounted that they are suspended midway between pole pieces 1, 2, 3 and 4 respectively, with a relatively small air gap between the faces of the pole teeth 17, 18, 19 and 20 and armature segment 7 and likewise between teeth 21, 22, 23 and 24 and armature segment 8. As shown by Formula 1, the available mechanical force varies directly with the magnetic flux density, hence maximum flux density is obviously desirable. The purpose in a small air gap is to obtain maximum magnetic flux with a minimum of magneto-motive force which must be produced by the field coils 9 and 10. The major portion of the magneto-motive force required to establish magnetic flux in a magnetic circuit is to overcome the reluctance of the air gap. The required magneto-motive force is directly proportional to the length of the air gap where the ampere turns required are expressed as follows:

*Formula 2*

Ampere turns per inch=0.3133×lines per sq. inch
or
Ampere turns per cm.=0.7958×lines per sq. cm.

The magneto-motive force required to overcome the reluctance of the iron in the magnetic circuit is usually quite small compared to the above and depends upon the magnetic material used and flux density at which it is operated.

The method and structure for supporting the armature segments 7 and 8 in the embodiment shown in FIGS. 3–5 will presently be described. For the present, and for the purpose of explanation, consider the armature segments 7 and 8 to be mounted rigidly with respect to each other and to be capable of movement in unison in the horizontal plane perpendicular to the vertical axes of the pole pieces as indicated by the directional arrows in FIG. 3. With this in mind, it will be apparent that, as the armature segments move, the air gap remains constant. The magnetic circuit reluctance also remains constant and hence the total magnetic lines of force in the magnetic circuit remain unchanged.

Referring now to the method and structure for supporting the armature segments, attention is directed to FIGS. 3 and 4 taken in consideration with FIG. 5 for understanding the details of such structure. The two armature segments 7 and 8 are supported in a non-magnetic frame to rigidly maintain spacing between segments and provide a means of suspending the segments midway between the pole pieces. The non-magnetic frame referred to is a part of an armature core assembly indicated generally at 25 in FIG. 5. The non-magnetic frame 26 connects to the stator portion of the device by means of a system of springs later to be described which maintain the position of the armature segments in relation to the stator and permit linear movement in the desired direction. The armature segments 7 and 8 oscillate between limits determined by the width of the pole pieces as will also later be explained. As mentioned, it is essential that the frame 26 be made from a non-magnetic material which can be cast or otherwise fabricated and need not necessarily be of metal if other materials are found to be advantageous and suitable to withstand mechanical stresses. The armature suspension system in a unit where the weight of the armature is significant must perform the functions of maintaining rigid and accurate positioning and alinement of the armature segments and provide mechanical resonance of the armature at the frequency to which the unit is designed to operate. It is also to be noted that where the oscillating motor armature is coupled to other devices, parts or machines with appreciable weight, the entire oscillating mass should operate in mechanical resonance as a unit. In instances where the weight of the armature is relatively small, it may not be necessary or desirable that the armature be in mechanical resonance at the operating frequency. In the present instance, as applied to a sanding or polishing operation, the complete armature consists of the armature core assembly, spring supports, pad frame and pad.

The frame 26 in the present embodiment is formed of non-magnetic side rails 27 and 28 joined by four cross supports 29 of like material. The armature segments 7 and 8 may be in the form of laminated transformer iron, to minimize eddy current losses, with the segments employing protrusions 30 at either end fitted into suitable slots in the cross supports 29 to rigidly support the armature segments with respect to the frame. The joints at the ends of each of the cross supports 29 and the side rails 27 and 28 may be silver soldered or otherwise connected to form an integral unit.

The frame for mounting a sanding or polishing pad 31 may be formed from square steel tubing or the like as illustrated. The frame consists of longitudinal frame members 32 and transverse braces 33 with a simple cross-lap joint at each of the four intersections which may be soldered or welded to form a pad frame. Clamp seats 34 are rigidly attached by any suitable means to the pad frame members 32 at each end to form a support for clamps 35 which may be used for clamping the ends of abrasive paper or polishing material. The plate 37 may be secured to the frame by any convenient means such as screws or bolts. The pad 31 may comprise any material such as felt for cushioning the abrasive paper or the like as will be understood by those skilled in the art.

Two identical spring support frames indicated generally as 38 in FIG. 5 serve to hold the pad 31 and associated framing rigid with respect to the armature core assembly 25. The frames 38 provide a means for securing the springs used to aline the armature and to provide mechanical resonance. In the present embodiment two types of springs are used. Eight identical compression coil springs 39 operate in opposition, four at either end of the unit to provide about half of the required accelerating force to provide mechanical resonance. The remaining accelerating force is provided by a flat cantilever guide spring system indicated generally at 40 in FIG. 3 and consisting of a plurality of stacked leaf springs 41 located transversely at each end of the unit and longitudinal side spring plates 42, the details of which will presently be described. The spring system 40 serves also to aline the armature core assembly between the stator pole pieces.

The spring support frames 38 are shown in FIGS. 3–5 and each comprises a box frame 43 which may be conveniently made from square steel tubing or the like with four feet or brackets 44, two of which support the armature core assembly above and two of which support the pad and frame below. Eight screws such as the screws 45 serve to secure the armature core assembly to the upper feet and similar screw means, not shown, may be used to secure the pad frame to the lower feet. Four holes 47 in the inner face of each of the spring support frames 38 provide openings for the coil springs 39 to pass therethrough to the outer face where they are centered by round bosses 48 welded to the box frame 43. A spring seat 49 is welded to each of the spring support frames 38 and provides for clamping the leaf springs 41 to the spring support frames. The spring seats 49 are the points at which the entire armature is supported and alined with respect to the stator.

Turning now to the stator structure, such structure consists generally of an upper core and a lower core both of which may be made from laminated transformer iron or the like. The upper core forms pole pieces 1 and 4 with slots 12 and 13, teeth 17, 18, 23 and 24 and the upper yoke 5. The lower core forms two pole pieces 2 and 3, slots 15 and 16, teeth 19, 20, 21 and 22 and the lower yoke 6. The upper core supports the upper energizing coil 11 and field coils 9 and 10 while the lower core supports the lower energizing coil 14. Referring now to FIGS. 3 and 4, the upper and lower cores are rigidly clamped between two non-magnetic spacer frames 50 by means of frame bolts 51 and 52 secured by the nuts 53 and washers 54. The upper yoke 5 is held by yoke clamps 55 by means of frame bolts 56 with associated nuts and washers as indicated in FIGS. 3, 4 and 5. On the ends of the yoke clamps 55 are mounted field core supports 57 to secure the upper ends of the field coils 9 and 10.

The inner ends of the coil springs 39 bear against coil spring anvils 58 mounted on stator frames 50 by anvil screws 59. The bosses 48 serve to center the coil springs 39.

The cantilever spring suspension system previously mentioned consists essentially of the guide springs 41 multiple mounted supporting the armature core assembly and are secured at the ends to the side spring plates 42 which in turn are rigidly supported by the stator frame. Referring to FIGS. 3 and 4, the guide spring assembly 40 is formed of guide springs 41 in the required number. These springs are separated by thin spacers 60 to avoid interference and friction between the springs during operation. A stack of springs 41 is secured by such means as the rivets 61 with the thick spacer 62 mounted on the outside and corner bracket 63 on the inside. The assembly 40 is attached to the side spring plates 42 by means of corner brackets 63 with screws 64 and tapped spacers 65. The spring plates 42 are rigidly supported by the stator frame by means of frame bolts 42a and nuts 42b with washers 42c. The complete armature is supported at the center of guide spring assembly 41, being attached by means of socket cap screws 66 through the thick spacer 67, springs 41 and thin spacers 60 into tapped spring seat 49.

The large ratio of widths to thickness of the leaf springs 41 and side spring plates 42 mounted as shown permits deflection in a horizontal plane but negligible deflection vertically. The vertical rigidity insures that the air gap between armature segments 7 and 8 and the stator cores remains constant during operation. During operation, the mid-point of the leaf springs 41 is deflected by the armature at spring seat 49 to either side of the rest position. The total distance between extremeties of displacement is the total amplitude of the armature. The leaf springs 41 are deflected and form a longer path between the two ends, the straight line distance between the two ends obviously become slightly less, with the amount of shortening depending upon the amount of spring deflection. This changing distance between the ends of the leaf spring 41 is absorbed by a slight deflection at the point of attachment of the side spring plates 42. The direction of motion of the armature and deflection of the springs 41 is shown by the arrow X—X. The direction of deflection of the side spring plates 42 is at right angles to the above and is shown by the arrow y—y.

Figure 6:
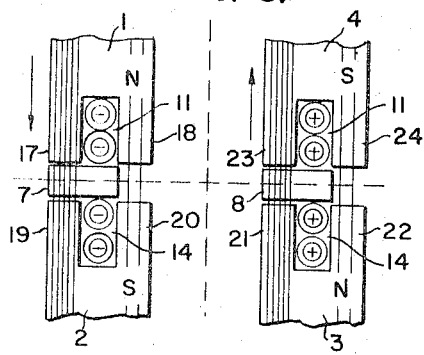
FIGS. 6–8 illustrate diagrammatically three different positions of the armature of the first embodiment.
Figure 7:
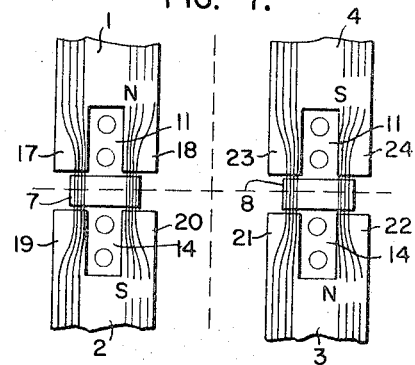
Figure 8:
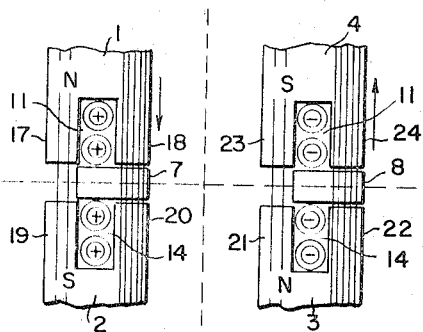

The operation of the embodiment of the invention just described may be better understood by referring to FIGS. 6, 7 and 8 which illustrate the magnetic flux distribution in the pole pieces corresponding to various armature positions during one cycle of operation. As will be presently described in detail, the magnetic segments 7 and 8 of the oscillating motor each come into register with the left teeth and right teeth of all pole pieces "simultaneously" during operation. This is accomplished through the geometric arrangement with a spacing between vertical center lines of the two armature segments being equal to the spacing of the vertical center lines of the main pole piece slots. This provides that, as the armature moves from left to right, transfer of the magnetic flux occurs "simultaneously" across conductors in the slots of the left pole pieces and right pole pieces. Because the flux transfer occurs "simultaneously" within both the left and right pole pieces, equal thrust is exerted upon both armature segments throughout the stroke. This form of flux transfer is true with all embodiments of the present invention and will define the term "simultaneous" flux transfer as used throughout the specification.

Referring now in detail to FIGS. 6, 7 and 8, it will be noted that the reference numerals used identify identical parts described in FIGS. 3 through 5. For reasons of explanation FIG. 6, 7 and 8 will be understood to represent a no load condition of the motor where the rest position of the armature coincides with zero current in the energizing conductors. FIG. 7 shows the armature in the rest position which is the midpoint of its travel and represents the position as shown in FIG. 5. In this position, the magnetic flux divides equally through the left teeth 17, 19, 23 and 21 and through the right teeth 18, 20, 24 and 22 of the pole pieces because the magnetic reluctance of each of the two available paths is equal. In FIG. 7, the current in the conductors in the coils 11 and 14 is assumed to be zero since there is no distortion of the magnetic flux. With current flowing as shown in FIG. 6, in the conductors of the coils 11 and 14, the magnetic flux is diverted to the left teeth 17 and 19 of poles 1 and 2 respectively. The armature segment 7 is pulled to its extreme left position since it will assume a position which gives minimum reluctance to the magnetic path. In poles 3 and 4, the flux is likewise diverted to the left teeth 21 and 23 and armature segment 8 is pulled to its extreme left position. A reversal of the current in conductors in the coils 11 and 14 causes the flux to be diverted to the right side of all pole pieces, thus causing both segments 7 and 8 of the armature to be pulled to the right hand limit as shown in FIG. 8. Thus when alternating current is impressed upon the energizing winding comprising the coils 11 and 14, the armature is forced alternately from left to right, making one complete cycle for each cycle of power supply. The unit inherently operates in harmonic motion and generates a sine wave voltage. When both the impressed voltage and generated voltage are of sine wave form, the current taken from the line is also a sine wave form and is said to be free of harmonics. This oscillating motor will, however, operate on an alternating current power supply with a voltage of most any wave form, whether it is sine wave or a chopped wave such as delivered by static inverters. It is an ideal load, however, for commercial power supplies most of which are very close to a sine wave form, since it will, when operated on a sine wave source, take a current very close to a sine wave. It is of significance when units of any appreciable size operated on commercial power systems take other than sine wave current. The resulting harmonics in the line current cause objectionable effects in the power systems and often create objectionable interference in associated communications systems.

For the oscillating motor to generate a sine wave voltage, the magnetic flux must be transferred from the left teeth of the pole pieces to the right teeth at a rate proportional to the velocity of the armature. This is accomplished by the proper dimensioning of the armature segments 7 and 8 as shown in FIGS. 6, 7 and 8. Referring to FIG. 6, the vertical dimension of the armature segment 7 is not critical, however, the horizontal dimension or length in direction of motion is important. In pole 1 for example, the length must be equal to the width of the pole tooth (17 or 18) plus the width of the pole slot 12. The maximum amplitude, which occurs at no load, is therefore equal to the width of one tooth. It is also essential that the width of all teeth be equal but not necessarily equal to the width of the slots. By inspection of FIGS. 6, 7 and 8, it will now become obvious that the magnetic flux is transferred from the left teeth, when the armature leaves the left position, at a rate proportional to the movement of the armature. When the armature has moved to half its stroke (½ the width of a tooth), half the magnetic flux has been transferred across the conductors to the right teeth. When the armature has reached the right position, theoretically all the magnetic flux has been transferred to the right teeth. With the armature moving in harmonic motion the velocity of the armature is maximum at the center of its stroke or mid-position which position is illustrated in FIG. 7. At this position, the transfer of magnetic flux is also maximum hence the voltage generated is maximum which is the crest value of the sine wave of voltage. At either end of the armature stroke the velocity is zero, the transfer of magnetic flux is zero, and hence the generated voltage is zero which is the zero point in the sine wave of voltage.

It will be noted at this point, that while 100% transfer of flux is not possible in practice, a value quite close to this can be attained by good design.

How the unit generates a voltage may also be understood by considering flux linkages about the energizing coils. It is common knowledge that a change of magnetic flux linking a coil of wire induces an electro motive force (E.M.F.) in the coil and the magnitude of the voltage is proportional to the rate of change of flux linkages. Referring to FIG. 6, the magnetic flux is diverted to the left teeth of all pole pieces. At this instance, magnetic, flux flows downward in teeth 17 and 19 and upward in teeth 21 and 23. The total flux therefore links both upper and lower energizing coils 11 and 14 and is flowing (upward) inside the coils and (downward) outside. Referring to FIG. 7, with the armature in the mid-position, half the magnetic flux flows downward in teeth 17 and 19 and upward in teeth 21 and 23. The other half flows downward in teeth 18 and 20 and upward in teeth 22 and 24. Inside the coil there is the same amount of flux flowing downward as upward and therefore no flux links the coils. Now referring to FIG. 8, where the flux is diverted to the right teeth of all pole pieces, it will be noted that the flux is flowing downward in teeth 18 and 20 and upward in teeth 22 and 24. The total flux now links both upper and lower energizing coils 11 and 14 but is flowing "downward" inside the coils ("upward" outside). This is a complete reversal of the magnetic flux linkages which link the energizing coils. It will therefore be obvious to those familiar with the art that an alternating voltage is generated in the conductors of the energizing coils 11 and 14 as the armature moves alternately to its left and right positions. One cycle of sine wave voltage is generated for each complete oscillation of the armature. According to Faraday's law of induction, a voltage is induced in the conductors in the coils 11 and 14 with the direction of the induced E.M.F. or voltage such as to produce a current opposing the flux change. The impressed voltage causes current to flow as indicated in FIGS. 6 and 8 which causes the flux change. The induced voltage is, therefore, opposite in direction to that of the impressed voltage. The current in an energizing winding depends upon the difference between the induced and the impressed voltages as in the case of other forms of electrical apparatus. This difference in the two voltages is effective to overcome the voltage due to resistance in the energizing coils to cause current of flow and may be expressed in the simple form by

*Formula 3*

$$I = \frac{(V-E)}{R}$$

where $I$ = current in amperes
$V$ = impressed voltage
$E$ = generated voltage or induced E.M.F.
$R$ = D.C. resistance of energizing coils Since a change of $10^8$ flux linkages per second produces an E.M.F. of one volt, the energizing winding can be designed for any sinusoidal voltage by the use of the following voltage equation:

*Formula 4*

$$E_{rms} = 4.44 f N \phi 10^{-8} \text{ volts}$$

where $E$ = generated voltage or induced E.M.F
$f$ = frequency
$N$ = number of turns in energizing coils
$\phi$ = maximum instantaneous value of flux linking the A.C. energizing coils In actual practice, the energizing coils of the units will contain many conductors (and turns) as required by the power supply and when the power supply voltage and other quantities are known, the above formula can be used to determine the required number of turns. With the oscillating motor operating at no load and with the armature free to follow the flux changes in the pole pieces, the generated voltage will be nearly equal to the impressed or line voltage, hence the line current will be small. As load is applied to the armature, thus impeding its movement, its amplitude will decrease slightly, with the result that less change in flux linkages about the energizing coils will occur than at no load. Therefore, a lower generated voltage will be produced in accordance with Formula 4 and the line current will increase as shown by Formula 3. The increased current produces higher thrust in the armature to overcome the work being done and tends to restore the original armature amplitude.

From the above analysis of operation, it will become obvious that the oscillating motor of the present invention may also serve to operate as an oscillating generator. When driven from an external means as some given frequency, the unit will, when the field is energized, produce an alternating voltage of the driving frequency with the magnitude of voltage depending upon the magnitude of the magnetic flux, turns in the A.C. winding and frequency of operation. This is in accordance with Formula 4.

The amplitude of the oscillating motor may be varied by adjusting the voltage applied to the energizing windings 11 and 14. As explained above, and as seen in FIGS. 6, 7 and 8 of the drawings, the maximum amplitude attained is equal to the tooth width and occurs with the field energized and with the full rated voltage applied to the energizing winding. Amplitude less than the maximum is obtained by decreasing the A.C. voltage applied to the energizing winding below the design or rated value. With the field strength remaining constant, the amplitude varies nearly in proportion to the applied A.C. voltage and the amplitude can be varied from zero to the maximum value in this manner. Some variation of amplitude is also possible by varying the field strength but within smaller limits than with the above method.

It will be recognized by those versed in the field of mechanics that it requires a force to accelerate any mass from one velocity to another. The relationship is:

*Formula 5*

$$F = ma \text{ or } F = \frac{W}{g} \times a$$

where $F$=force in pounds $m$=mass or $\frac{\text{wt. in lbs.}}{32.2}$ $a$=acceleration in feet per sec. per sec.
$w$=weight in pounds
$g$=acceleration of gravity (32.2 ft./sec./sec.)

The armature of the oscillating motor of the present invention necessarily has some mass which includes the armature segments 7 and 8, the frame which supports the segments, the suspension system for the armature and associated parts. For the armature to oscillate at some frequency will require accelerating forces to bring the armature up to velocity, then decelerate it and reverse it at the end of the stroke. Where the mass of the armature is relatively small, these accelerating forces may be small and may be supplied by the electro-magnetic action. These must be sufficient for both acceleration and to do useful work. In the event of larger masses (armatures having more weight) the accelerating forces required may be in excess of the magnetic forces available. In this instance, it is desirable to use a suspension system employing an elastic medium with such characteristics as to permit the armature to oscillate at its natural period of mechanical frequency, commonly known as resonant frequency.

The force required to cause a body to oscillate in simple harmonic motion varies directly as the distance of the body from the center of the path. At the center of its path the accelerating force is zero and velocity is maximum. At the end of its path the velocity is zero and the accelerating force is maximum. This maximum force may be expressed:

*Formula 6*

$$F = \frac{W \times \pi^2 \times N^2 \times r}{900g}$$

where $F$=force in pounds
$W$=weight of body in pounds
$g$=acceleration of gravity (32.2 ft./sec.$^2$)
$N$=oscillations per second
$r$=distance from midpoint of path to extremity of travel (amplitude) expressed in feet One suitable means of providing this accelerating force, which must be proportional to the displacement at any instant, is by the use of springs. Any other elastic mediums may be employed which have characteristics similar to or resemble those of the springs.

For a given weight of armature to oscillate at some frequency requires a specific force constant; that is accelerating force per unit of displacement. This can be supplied by a spring suspension arrangement with a spring constant equal to that required by the armature oscillating at the designed frequency. At a given frequency the same spring constant is good for any amplitude within the mechanical limit of the springs. When this condition is satisfied the unit is said to be in mechanical resonance at the designed frequency of operation. The unit will, when under conditions of mechanical resonance, require very little external force (at the design or resonant frequency) to cause it to oscillate. In fact, the only force necessary is that to overcome the losses which are principally internal friction of the springs and windage losses due to air friction retarding the armature movement, both of which are relatively small. When operated electrically at no load output the unit will therefore oscillate freely, with springs supplying the forces to maintain oscillation, taking only enough electrical energy to overcome the above no-load mechanical and electrical losses. At no-load the electrical loss is small because of the low value of line current in the energizing winding. Electrical losses are a total of the copper losses in the energizing winding and in the field winding. These may be expressed as follows:

*Formula 7*

A.C. Losses: $W_{ac} = I^2R$ where $W$=Watts loss in energizing winding
$I$=Line current in energizing winding expressed in amperes
$R$=D.C. Resistance of energizing winding in ohms

*Formula 8*

D.C. Losses: $W_{dc} = VI_{dc}$ where $W$=Watts loss in field winding
$V$=Voltage across field winding in volts.
$I$=Current in field winding in amperes or $W_{dc} = I^2R$ where quantities are same as above except applied to field winding.

While the excitation load is essentially constant regardless of load, the energizing winding loss varies with the load. With load applied to the unit, the line current in the energizing winding increases to produce higher electromagnetic forces to overcome the work being done. The electrical input increases accordingly and at any condition of load the efficiency may be expressed:

*Formula 9*

$$\text{Eff.} = \frac{\text{Output}}{\text{Input}}$$

where

Output=Useful mechanical output expressed in watts
Input=Total electrical input to field and energizing windings expressed in watts According to data taken on the embodiments described, the efficiency of the oscillating motor of the present invention is comparable to that of the widely used rotating motors.

Figure 9:
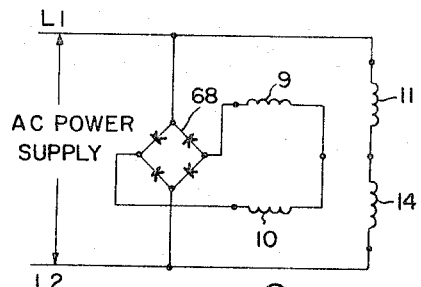
FIG. 9 is an electrical circuit diagram for the first embodiment.

FIG. 9 is an electrical schematic illustrating a typical A.C. circuit for connecting the energizing coils 11 and 14, the field coils 9 and 10 with the use of a rectifier 68 for converting the A.C. line current to D.C. to supply the field coils.

A second form of the present invention is shown in FIGS. 10 through 15 which constitutes an improved magnetic structure for producing oscillating motive power. The form of the invention shown in FIGS. 10 through 15 operates on the same principle as described for the first embodiment of the invention shown in FIGS. 1 through 9. Whereas the device shown in FIGS. 3 through 5 is asymmetrical with all excitation field coils above the main pole pieces, the embodiment now to be described employs a separate field coil for each of the four pole pieces making the device symmetrical about the horizontal, vertical and longitudinal axes. This arrangement gives a more uniform distribution of magnetic flux in the four pole pieces with a better balance of thrust produced by upper and lower energizing coils. This symmetrical arrangement also provides a more compact design.

Figure 15:
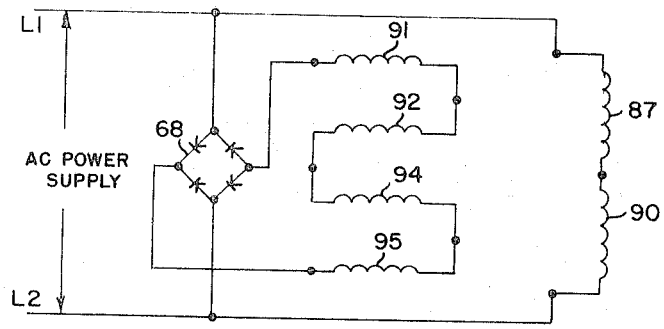
FIG. 15 is an electrical circuit diagram for the second embodiment.

The connections for the present oscillating motor are essentially the same as for the first embodiment. The field coils are supplied unidirectional current from either a direct current source or a rectified alternating current source of power. The energizing coils are connected directly to the alternating current supply. Since this symmetrical magnetic design provides for equal induced voltage in each of the two energizing windings, it lends itself to either series or parallel connection of energizing coils for dual voltage applications with no detrimental circulating current in the energizing windings. A circuit diagram for the present form is shown in FIG. 15. Another major improvement in this second form of oscillating motor is a simplified spring suspension system for the armature. Only one type of spring is used which (first) accurately supports the armature in a straight line during operation providing linear motion with respect to the stator and to maintain a constant air gap between armature and stator, (second) provides a total accelerating force necessary for mechanical resonance at the operating frequency and, (third) through its unique shape provides for direct mounting of the rigid frame thus eliminating the need of separate support springs.

This arrangement of components also lends itself to taking power from the unit at four places. Means for power take-off can be adapted to either end of the unit at the pressure plate which moves with the armature which is secured at the mid-point of the spring. For illustration, a circular power take-off shaft 69 is shown on one end of the unit in FIGS. 10 and 11. Also the armature can be adapted for top or bottom power take-off extended through a top or bottom opening in the frame.

Various appurtences may be essential in the completed unit depending upon the application for which it is intended. Such items as enclosure, mountings, terminal board, switches, handles etc. may be added by anyone versed in mechanical and electrical design to whom the methods of attachment become obvious.

Figures 10, 11, 12:
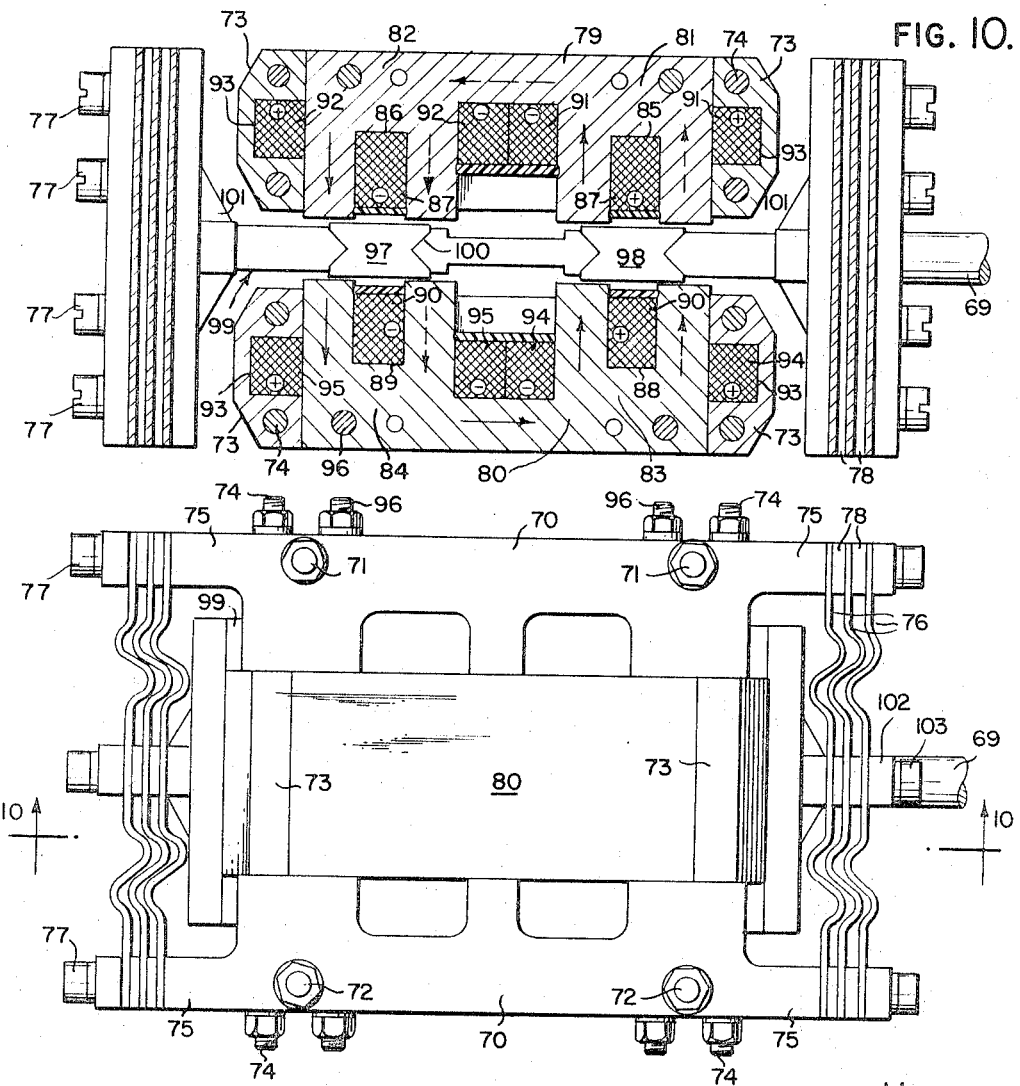
FIG. 10 is a cross sectional view of a second embodiment of the invention taken along lines 10—10 of FIG. 11.
FIG. 11 is a side elevational view of the second embodiment of the invention.
FIG. 12 is an end view of the second embodiment.

The assembled oscillating motor is shown in side view in FIG. 11. FIG. 10 is a longitudinal section taken along lines 10—10 of FIG. 11 showing the complete unit and also illustrating the core and coils with polarity designations on conductors indicating required coil connections. The complete stator frame is formed of four identical stator frame members 70 with two of the frame members being clamped in side by side relation by means of the clamp bolts 71 to form the upper section of the stator frame and the remaining two frame members being clamped together by the clamp bolts 72 to form the lower side of the stator frame. The upper and lower sections of the stator frame are held in spaced relationship by means of the stator frame spacers 73 as indicated in FIGS. 10 and 11. The spacers 73 are held in position by means of the eight connecting bolts 74 to completely rigidify the stator frame. Each end of each stator frame member 70 includes a protruding portion 75 which receives a plurality of stacked spring plates 76 on each end of the stator frame with the spring plates 76 being clamped to the protruding portions 75 by means of cap screws 77 or the like. The details of the spring plates 76 will be presently described. The spring plates 76 are held in spaced relationship by means of a plurality of spacers 78 along their top and bottom edges.

The stator portion of the present form of the invention includes two identical stator members 79 and 80 of magnetic material. The stator members 79 and 80 are generally U shaped as shown in FIG. 10 with the stator member 79 forming pole pieces 81 and 82 and the stator member 80 forming opposing pole pieces 83 and 84. The pole pieces 81 and 82 are also provided with slots 85 and 86 respectively, for mounting the energizing coil 87 while the pole pieces 83 and 84 are provided with slots 88 and 89 respectively for receiving a second energizing coil 90. The field coils 91 and 92 extend about the pole pieces 81 and 82 respectively with slots 93 in the stator frame spacers 73 being provided to receive the field coils as illustrated in FIG. 10. Likewise a second pair of field coils 94 and 95 extend about the pole pieces 83 and 84 on the stator unit 80 with identical slots 93 being provided in the associated stator frame spacers for receiving the coils. As indicated in FIG. 11, the stator members 79 and 80 are located between the upper and lower sections of the stator frame and may be clamped therebetween by means of frame bolts 96.

The armature segments 97 and 98 are supported midway between the pole pieces 82 and 84 and 81 and 83 respectively by means of a generally rectangular armature frame 99 which may be cast or otherwise formed from non-magnetic material as desired. As shown in the drawings, the armature segments 97 and 98 may be provided with V grooves with insulation material 100 being provided to electrically insulate the ends of the laminations of the armature segments and the supporting portion of the armature casting 99 to minimize eddy current losses. The armature frame 99 is suspended at either end by armature supports 101 by any suitable means such as cap screws or the like. The armature frame supports 101 are in turn suspended in the proper position by the springs 76 which are secured to the stator frame as indicated in FIG. 11. A pressure plate 102 may be used in combination with the screws 103 for securely clamping the armature supports 101 to the springs 76 as indicated in the drawings.

Figure 13:
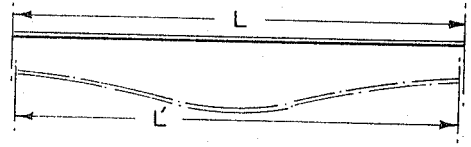
FIG. 13 is a schematic view of spring deflection.
Figure 14:
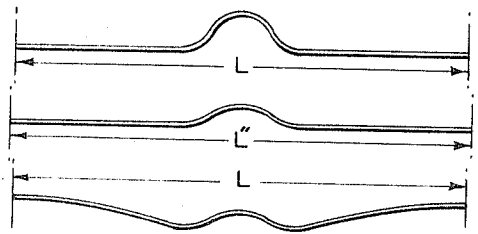
FIG. 14 is a schematic view of the deflection of the spring used in the second embodiment.

Turning now to the springs 76, such will be provided at each end of the stator frame to furnish the required accelerating forces with the spacers 78 being placed between springs to prevent interference and friction between adjacent springs during operation. The principle behind the development of the uniquely shaped spring used in the second form of the invention just described may be more readily understood by referring to FIGS. 13 and 14. FIG. 13 shows an edge view of any straight cantilever spring of length L and thin in comparison to the width. As also shown in FIG. 13, when the spring is deflected at the center, it becomes slightly shorter in length. The distance between the ends becomes slightly less (L') because of the curved path taken by the spring. FIG. 14 illustrates a spring of length L similar to the above with an expansion bend in the center. As also shown in FIG. 14, by application of tension to the spring, the expansion bend will provide an increase in distance between ends, L", by the straightening of the expansion bend. Now, assuming the spring with expansion bend shown in FIG. 14 is deflected and at the same time tension is applied to the springs, the spring is capable of maintaining the original distance L between its ends. Likewise if the ends of the spring in FIG. 14 are anchored so that distance L cannot change, the necessary tension will be provided in the spring when it is deflected to "stretch out" the expansion bend and provide the extra length required because of the longer path taken.

The shape and location of the expansion bend may be varied to a wide degree. To adapt the expansion bend to a spring for use in the oscillating motor, however, the bend should be preferably located midway between points of support. The middle of the springs where the armature is secured must be, in this case, also considered a point of support. Since the bending stress in the spring is at a maximum at this point of support, to add the expansion bend near the support adds additional stress to a maximum stress area. The stretching out of the expansion bend also causes bending stress in the spring, the same as does the deflecting of the spring. Therefore, to make maximum use of spring material, the expansion bend should be located where the bending stress due to deflection is at a minimum. Zero bending stress occurs midway between support points. This principle is utilized in the springs 76 as illustrated in FIG. 11 which shows an S bend included for expansion on either side of the armature anchor point. This characteristic, when applied to the springs 76 of the present embodiment, permits the ends of the springs to be secured directly to the stator frame, at points between which the distance is fixed, thus providing a simple mounting eliminating the need of separate support springs as were used in the first embodiment of the invention shown in FIGS. 3–9. A large ratio of width to thickness of springs 76 provides large armature amplitude (long stroke) with negligible deflection in the direction of the axis or the main pole pieces. This spring therefore provides, during operation, precise straight line motion of the armature with respect to the stator without variation of the armature air gap.

Figure 16:
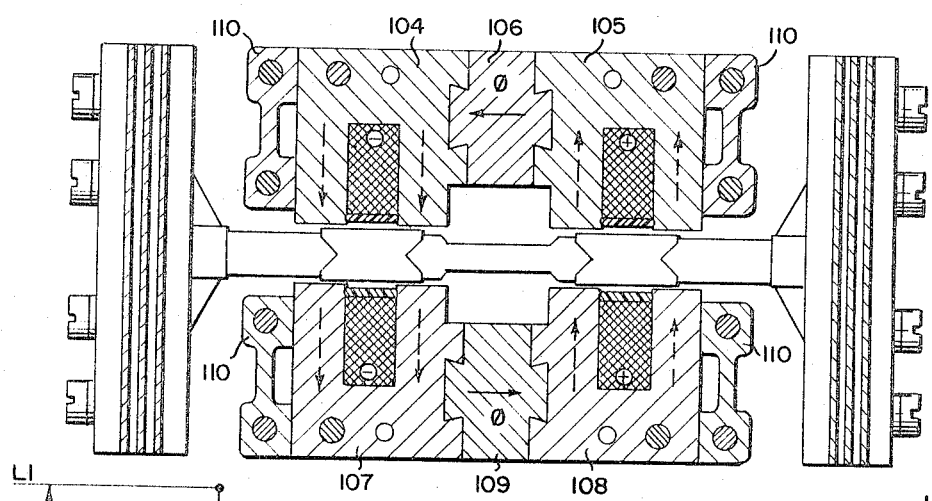
FIG. 16 is a view similar to FIG. 10 but illustrating a third embodiment of the invention.
Figure 17:
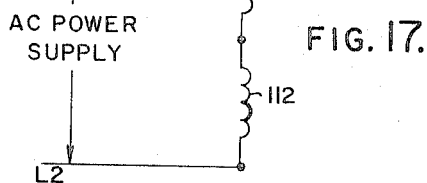
FIG. 17 is an electrical circuit diagram for the third embodiment.

A third form of the oscillating motor is illustrated in FIGS. 16 and 17. The third form of the oscillating motor is one using a magnetic structure similar to that described in the second embodiment of the invention except that the magnetic field is established in a different manner. This unit operates on the same principles as does the first and second forms of the invention except the excitation field coils have been replaced by permanent magnets to establish the magnetic field. Elimination of the field coils simplifies the electrical portion of the motor leaving only the two energizing coils which are connected directly to the alternating current power supply.

The permanent magnet type of oscillating motor forming the third embodiment is constructed essentially the same as the second embodiment of the invention in all respects except for the core and coils.

Reference is made now to FIG. 16. Whereas, in the embodiment shown in FIGS. 10 through 15, the pole pieces 81 and 82 and their connecting yoke are made of one punching or casting, all the pole pieces in the present form are separate elements or units and are identical The pole pieces 104 and 105 of the present embodiment are connected magnetically by the permanent magnet 106 which is magnetized in a horizontal direction as viewed in FIG. 16 and indicated by the arrow. Likewise, pole pieces 107 and 108 are connected by a similar permanent magnet 109 positioned so that the polarity of poles 104 and 108 are alike and that of poles 105 and 107 are alike. Thus permanent magnets 106 and 109 produce a magnetic field in the core structure similar to that produced by the field coils in the embodiment in FIGS. 10 through 15. Each of the pole pieces, 104, 105, 107 and 108 includes a slot for the reception of energizing coils located in a manner as described for the previous embodiment. With the energizing coils connected to the alternating current power supply, the oscillating motor operates exactly as described in the first and second forms of the invention.

The only other change from the form shown in FIGS. 10 through 15 is the shape of the stator frame spacers 110 which perform only a single function in the permanent magnet unit, which is that of accurately spacing the stator frame segments for proper mounting of springs as previously described. In the permanent magnet form, there are no field coils requiring support and hence the stator frame spacers are relieved of this function.

As described in the case of the first and second forms of the oscillating motor discussed above, the permanent magnet form will serve as an alternating current generator as well as a motor. When driven mechanically from an external oscillating source, the unit will generate an alternating voltage in the energizing winding and will carry load within the electrical capacity of the energizing windings. It will also be noted that the permanent magnet form shown in FIG. 16 responds to variation of input voltage to the energizing winding to cause variation of amplitude (or stroke) approximately proportional to the voltage. FIG. 17 is an elementary circuit diagram for the energizing coils of the permanent magnet form and illustrates the energizing coils 111 and 112 connected in series across the A.C. power supply.

Figure 18:
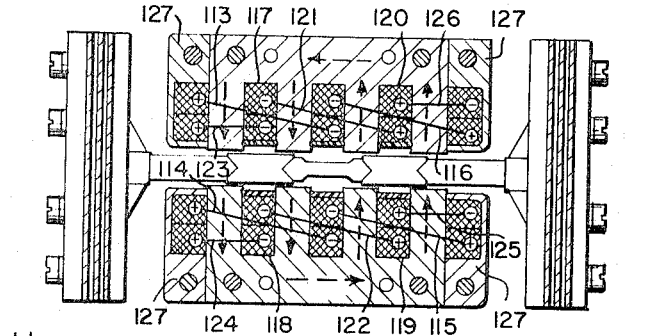
FIG. 18 is a view similar to FIG. 10 but illustrating a fourth embodiment of the invention.
Figure 19:
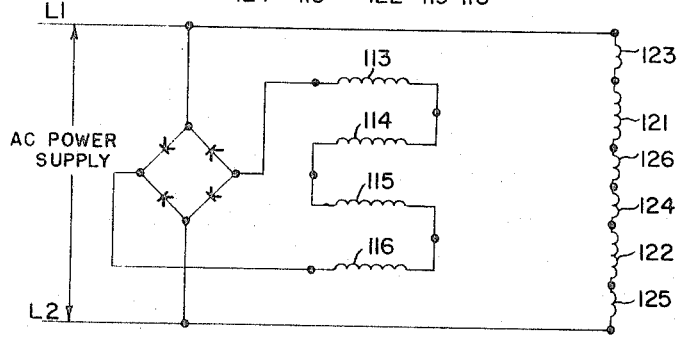
FIG. 19 is an electrical circuit diagram for the fourth embodiment.

A fourth embodiment of the present invention is illustrated in FIGS. 18 and 19. This form of oscillating motor is one incorporating an electro-magnetic field in the core and coil structure slightly modified from that used in the second form of the invention shown in FIGS. 10 through 15. The core and coil arrangement offers a different method of winding the stator core and results in a more compact unit or one more adaptable to a particular application or enclosure. The basic operating principles are the same as for the second form of the invention. This winding arrangement also lends itself to an extended type of unit of longer proportions as will be discussed in later forms of the invention.

FIG. 18 illustrates the core and coil structure according to the fourth embodiment. Referring to FIG. 18, field coils 113, 114, 115 and 116 usually connected in series are connected to a unidirectional power supply to provide a magnetic field in the structure as in the case of the second embodiment. Energizing conductors 117, 118, 119 and 120 perform the same function as in the second embodiment of the invention of diverting the magnetic flux alternately from the left to the right teeth of each pole piece to produce oscillation of the armature. Half the energizing conductors in each slot are connected as in the second embodiment. Referring to FIG. 18, upper conductor 117 connects to lower conductor 120 to form energizing coil 121 and likewise in the lower core energizing coil 122 is formed. The remaining half of the energizing conductors form end coils. Thus lower conductor 117 connects around the end tooth to form energizing coil 123. In like manner, energizing end coils 124, 125 and 126 are formed. This coil configuration is herein referred to as a "lap" winding. In winding the upper stator core, the coils would be inserted in the following order; energizing end coil 126, field coil 116, energizing center coil 121, field coil 113 and finally energizing end coil 123. Aside from the above modified core and coil arrangement, the only other material difference between the remaining structure of this fourth embodiment of the invention and that of the second embodiment is the modification of the stator frame spacers 127. Stator frame spacers 127 enclose the outer turns of both the field coil and an energizing end coil. This is illustrated in FIG. 18.

The electrical connections for this form of motor are essentially the same as for the second embodiment of this invention. The field coils are supplied unidirectional current from either a direct current source or a rectified alternating source of power. The energizing coils in the upper core are all connected in series as are all the energizing coils in the lower core. The two groups of energizing coils may be connected either in series or in parallel to suit the power supply. FIG. 19 is a circuit diagram for the fourth embodiment of the invention and shows the electrical connections for the field and energizing coils.

Figure 20:
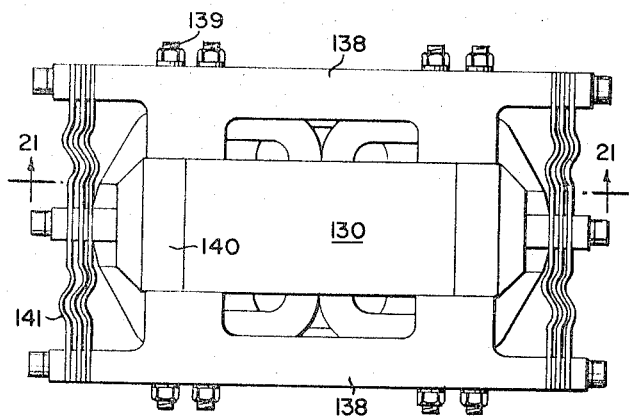
FIG. 20 is a top plan view of a fifth embodiment of the present invention.
Figure 21:
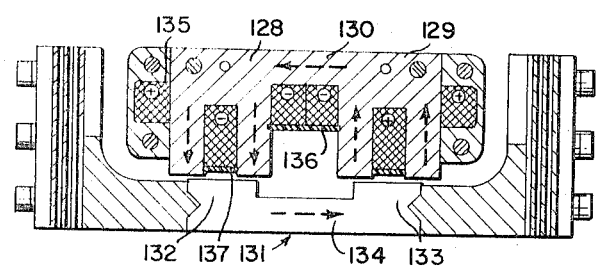
FIG. 21 is a sectional view taken along line 21—21 of FIG. 20.

A fifth form of oscillating motor is shown in FIGS. 20 and 21 and constitutes a two pole unit which lends itself to a flatter design in comparison to the above mentioned forms. It is practical where the physical dimensions permit less height than required by the four pole versions. It is also useful where horsepower requirements are small. The two pole oscillating motor, with all other factors being equal, develops one-half the horsepower of that of the four pole unit. A typical application for this form of the invention may be an oscillating hand sander, polisher or the like where power is taken off the top, bottom or side of the unit rather than the end.

FIG. 21 illustrates the core and coil arrangement for the fifth embodiment. The similarity to the four pole type will be observed since the two pole type is essentially just "half" of the four pole type. FIG. 21 is a longitudinal section of the complete unit illustrating the armature core cast integral with the armature frame. As seen in FIG. 21, the stator core structure is composed of two pole pieces 128 and 129 connected with an upper yoke 130. The two pole armature core 131 consists of armature segments 132 and 133 connected by armature yoke 134. In the second embodiment of the invention, the magnetic flux from the poles passes through the armature segments and into the oppositely positioned poles. In this form, since there are only two poles, the magnetic flux must pass from armature segment 132 directly to segment 133 then into the pole piece 129, thus requiring armature yoke 134.

The principle of operation of this fifth embodiment of the invention is the same as explained above for the previous forms of oscillating motor. This unit also requires unidirectional current for excitation field windings 135 and 136 and, when the energizing winding 137 is connected to an alternating current power supply, it produces one complete oscillation for each cycle of the power supply. The stator core and coil assembly is rigidly clamped between two stator frames 138 secured by frame bolts 139 with suitable nuts and washers. The stator frame spacers 140 accurately space the stator frames 138 for proper mounting of the springs 141. Springs 141 suspend the armature 131 with respect to the stator core consisting of the pole pieces 128, 129 and the yoke 130 in a manner similar to that in the other forms of the invention. Power may be taken from the armature 131 by any convenient means of attachment.

It will also be understood that the core and coil arrangement in the embodiment shown in FIGS. 20 and 21 and comprising the fifth form of the invention may be modified to accept a lap winding such as described and used in the fourth form of the invention shown in FIGS. 18 and 19. Further modifications of the two pole oscillating motor illustrated in FIGS. 20 and 21 would include the use of a permanent magnet in place of the field coils 135 and 136 for establishing the magnetic circuit in the same manner as described in connection with the third form of the invention illustrated in FIGS. 16 and 17 and described above.

A sixth embodiment of the invention is one utilizing the core and coil structure of the device of the fifth embodiment but with the use of a permanent magnet as described in the third and with a different frame and armature suspension system.

For applications where precise straight line motion with respect to the stator is not essential, the present embodiment has the advantage of simple springs. Although the armature moves in a plane perpendicular to the pole piece axes, maintaining a constant air gap, its direction of motion deviates in one plane a small amount from a straight line during its stroke. An example of the significance of this characteristic is that it could be used on an oscillating hand sander where precise straight line motion is not imperative, but could not be direct-coupled to the piston of a compressor without some auxiliary flexible coupling means. The pole pieces 142 and 143 joined by the permanent magnet 144 supporting the energizing coil 145 are rigidly clamped between two stator frames 146 and secured by six frame bolts 147. The armature unit 148 with diagonally opposite studs 149 is supported by straight cantilever springs 150 anchored to armature support studs 149 on one end and to the stator frame 146 on the opposite ends by means of screws 151 with washers 152 and pressure plate 153. The springs 150, mounted as shown in FIGS. 22 and 23 provide for motion of the armature 148 to right and left (as viewed in FIGS. 22 and 23) in a plane perpendicular to the axes of pole pieces 142 and 143. The armature is thus free to oscillate during operation with no vertical motion hence the air gap between the armature 148 and the faces of poles 142 and 143 remains constant.

FIG. 25 shows diagrammatically in plan view the approximate relative positions of spring 150 at either end of the motor. Springs 150 are secured to stator frames 146 at points 0. With armature 148 in its rest position, the opposite end of springs 150 are in position A. Assume the armature is alined under these conditions exactly parallel to the stator as indicated by the direction arrow A—A. As the armature moves upward as viewed in FIG. 25 (plan view) the ends of the springs 150 supporting armature 148 assume position B. The path taken by the ends of springs 150 supporting armature 148 is represented by dotted curves B'–A'–C' showing the curved path very much exaggerated. Dotted curves B'–A'–C' are used to show the upper end of the armature deviates to the left when away from the rest position and likewise the lower end to the right. Therefore, with the movable ends of springs 150 at position B armature 148 assumes a direction with respect to the stator as represented by arrow B—B (exaggerated). Likewise when the armature moves downward from rest position it assumes a direction as represented by arrow C—C (exaggerated).

The amount of deviation from exact linear motion in this type of oscillating motor depends upon the length of the springs and the length of the stroke. The principle of operation of this unit is otherwise the same as in the fifth form of the invention and the electrical characteristics are not affected by the above non-linear movement of the armature since the air gap remains constant during operation.

The seventh form of the present invention is illustrated in FIG. 26 and constitues an extended design similar to the fourth embodiment of the invention shown in FIGS. 18 and 19 but differs in that it consists of an eight pole core and coil structure to provide higher horsepower output.

FIG. 26 is a diagrammatic illustration of the core and coil structure of the seventh form of the invention. By comparison with FIGS. 18 and 19, it becomes apparent that the eight pole type is basically two four pole units as shown in FIGS. 18 and 19. The extended arrangement is made possible by the use of the lap winding described earlier in the fourth embodiment. The drawings and the explanation of the preceding forms of the present invention will enable those familiar with the art to adapt this form of oscillating motor to a suitable frame and suspension system and therefore, such details are not repeated. FIG. 26 shows all of the conductors with polarity indications. The excitation circuit consists of eight field coils, two upper left hand field coils 154; two lower left hand coils 155; two lower right hand field coils 156; and two upper right hand field coils 157 connected preferably in series and to the direct current excitation supply voltage. The energizing winding is formed of three upper center coils 158 with upper end coils 159 and 160. The lower energizing winding is formed by three center coils 161 with end coils 162 and 163. All upper energizing coils are connected in series and likewise with lower energizing coils. The upper and lower groups may be connected in series or parallel to suit the power supply.

The directional arrows in the multiple teeth and pole pieces of the stator pieces 164 and 165 indicate the direction of the magnetic flux.

It will become apparent to those familiar with the art that many forms of the motor shown in FIG. 26 are possible in addition to those described herein. For instance, a four pole flat version similar to the fifth form of the invention shown in FIGS. 20 and 21 can be built which would be essentially the upper half of the seventh form just described. Also another unit similar to the present seventh form can be built with permanent magnets providing excitation in place of electro-magnets as described in the third embodiment illustrated in FIG. 16 and 17. Likewise, the above four pole flat version mentioned can be built with permanent magnets replacing the electro-magnets.

The operation of the seventh form of the oscillating motor shown in FIG. 26 and other above mentioned versions is the same as for the previous forms. It can be designed for any frequency and will make one complete oscillation for each cycle of power supply as previously described.

Any form of the oscillating motor thus far described may be adapted for operation on a direct current power supply with the use of a bi-phase half wave (2 element) inverter as previously mentioned by a slight modification of the energizing windings, with such modification of the energizing windings being shown in FIGS. 27 and 28. No modifications are required to operate any of the discussed forms of the oscillating motor from a direct current source of power where the conversion equipment delivers a full wave alternating current such as does a rotary inverter or a full wave (four element) inverter.

FIG. 27 illustrates the modification required in the energizing winding of the second form of the invention shown in FIGS. 10 through 15 by way of example for adapting the oscillating motor to a bi-phase half wave inverter for operation on direct current. Reference should be made, therefore, to FIG. 15 for comparison with the circuit diagram. The modification necessary is to provide each of the energizing windings with a center tap. Referring to FIG. 27, one line of the direct current supply connects to the center tap of the windings 87 and 90 so that current flows first in one direction in coil 87–1 and 90–1 when semi-conductor Z–1 conducts current and then in the opposite direction in coil section 87–2 and 90–2 when semi-conductor Z–2 conducts current as represented by the arrows in FIG. 27. Current must flow alternately in one direction in one-half of each energizing coil then in the opposite direction in the other half to divert the magnetic flux alternately from one side of the pole piece to the other side to produce oscillating motion. This may be further understood by reference to FIGS. 10 and 11 of the second embodiment.

It will now become apparent that energizing coil 87, for instance, may either be center tapped as shown in FIG. 27 to form two half sections 87–1 and 87–2 or it may be separate coils wound in the same slots connected such that current flows alternately in opposite directions as semi-conductors Z–1 and Z–2 alternately conduct current. FIG. 28 illustrates the connections for a two coil arrangement applied to coil 87 wound with separate half coils 87–A and 87–B. With the above information, those versed in the art will be capable of adapting the energizing windings of any other form of the present oscillating motor to a bi-phase half wave (2 element) inverter for operation on a direct current power supply.

Since the present disclosure is not devoted to features of the inverter per se, such inverter 166 is enclosed in FIG. 27 in dotted lines. The inverter 166 may incorporate any appropriate type of controlled electronic tube or semi-conductor devices such as the semi-conductors Z–1 and Z–2 and may incorporate any suitable form of oscillator 166a available in the prior art. The inverter can be controlled by an oscillator of a frequency independent of that of the oscillating motor in which event the natural mechanical frequency of the motor must match the oscillator frequency. The inverter, may, on the other hand, incorporate an oscillator in which its frequency is determined by the natural mechanical frequency of the oscillating motor in which event, feed back windings 167 and 168 shown in dotted lines in FIG. 27 will usually be required on the oscillating motor core for control of the electronic tube or semi-conductor devices Z–1 and Z–2. The dotted lines indicating the feed back coils 167 and 168 in FIG. 27 illustrate how they are to be wound, when required, in the slots as the energizing coils with polarity and generated voltage as required by the inverter.

Attention is now directed to the modification of slot and tooth design shown in FIG. 29 which is adaptable to all of the forms of the present invention described herein. All discussion thus far has dealt with an open slot where both sides of the slots and teeth are parallel. The modification shown in FIG. 29 relates to a partially closed slot where the end or face of the tooth is widened so as to form a nearly contiguous magnetic surface adjacent to the armature segments. Referring specifically to FIG. 29, the motor comprises two stator pieces 169 and 170 which may be in all respects identical with any of the previous embodiments discussed. The stator piece 169 has two pole pieces 171 and 172 aligned with the pole pieces 173 and 174 respectively on the stator 170. Each pole piece is provided with identical field coils 175 for maintaining a constant unidirectional magnetic field through the pole pieces and through the armature segments 176 in the direction of the flux arrows as will be apparent from previous discussion.

As shown in FIG. 29, each of the pole pieces is provided with two identical slots 177. The slots 177 serve to mount energizing coils as illustrated and it will be understood that the energizing coils are connected to a source of alternating current. As in previous embodiments, as the alternating current in the energizing coils reverses, the magnetic flux paths will be shifted from one tooth to another within the pole pieces to exert a thrust on the armature segments. The armature segments 176 are shown in the center or rest position in FIG. 29 and the polarity of the current in the conductors of the various slots is shown so as to produce a thrust in the right hand direction. It will be understood that the flux paths will be shifted so as to be concentrated in the center and right hand teeth of each pole to produce thrust to the right. As the current reverses, the segments 176 will move from the extreme right hand position to the center and then to the left hand position with the thrust being in the left hand direction as seen in FIG. 29. It will also be understood that the number of slots per pole is not limited to that shown in FIG. 29 but may range from one slot and upwards per pole.

It will be noted that each tooth of each pole piece in FIG. 29 is provided with a widened face for increased flux transfer surface with the tooth faces partially closing the ends of the slots 177. The partially closed slot design provides for longer strokes of the armature than possible with open slot design. While the magnetic flux is diverted between teeth by the alternating current in the energizing coils in the same manner as in the previous embodiments, the armature travels a longer distance corresponding to the wider tooth face. The wider tooth design also reduces the flux density across the air gaps between aligned teeth and thereby allows an increased flux in the magnetic circuit with a given field coil strength as compared with the open slot design. By increasing the number of slots per pole, the total pole face width may be increased thereby further increasing the length of stroke accordingly. In the partially closed slot modification the center lines of the armature segments will have the same spacing as the pole pieces and the flux transfer is uniform throughout the stroke and occurs simultaneously for any number of slots per pole and any armature pitch.

The use of partially closed slots will limit the energizing coils to random windings, but will permit the use of armature segments of solid iron construction instead of laminated segments as required in the open slot stator forms. The reasons for the laminated armature segments in the open slot design as described herein will become apparent by the fact that the magnetic flux changes location within the segments during operation. The flux is not evenly distributed throughout the armature segment but flows at times through the left half and at other times through the right half depending upon the position of the armature. As the magnetic flux shifts laterally within the iron armature segment, voltages are induced in the iron requiring that it be laminated to avoid eddy currents. In the partially closed design, the magnetic flux is nearly evenly distributed throughout the armature segments. Since there is no flux shift within the segments during operation, there are no induced voltages to cause eddy current, hence no need to laminate the armature segments. The segments can be of solid material thus simplifying the construction and providing a less costly and more rugged armature. It is to be noted that the flux distribution within the armature segment is "nearly" and not "exactly" uniform because of the small opening between the teeth in the partially closed tooth design which is essential for entry of wire. Theoretically, with the slots closed at the tooth tips, completely uniform distribution of flux would result at the pole faces. The flux does "fringe out" somewhat at the tooth tips, however, and tends to distribute uniformly as it enters the armature segment. The deviation from ideal is so slight with the small slot opening that, in practice, solid segments can be used with negligible eddy current losses. It should also be noted that all armature arrangements for use with the partially closed slot design are necessarily of the "simultaneous" form of flux transfer where the armature segments spacing coincides with the main pole piece spacing. In the closed slot form, as with the open slot form, thrust is exerted simultaneously on both armature segments throughout the stroke and back E.M.F. (or generated voltage) is induced simultaneously in the appropriate conductors in all pole pieces. Theoretically, to obtain absolutely uniform transfer of flux in the stator to generate a voltage exactly proportional to armature velocity, would also require that the tooth tips be closed. The fringing of the flux at the tooth tips, however, provides distribution of flux good enough, that, for all practical purposes, flux transfer is nearly uniform and induced voltages are proportional to armature velocity.

While the present specification describes specific embodiments of the present inventions relating to motor structures, it is to be understood that electrical generator structures embodying the concepts disclosed herein are within the scope of the present invention. It will also be understood that, by utilizing direct current or in-phase alternating current in both the field and energizing coils, the structures of the present invention may be used as unidirectional actuators or solenoids.

It will be readily apparent to those skilled in the art of electrical motors and generators and especially linear oscillating motors that the present invention provides novel and useful improvements in such devices. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. In combination; a stator member having spaced pole pieces extending therefrom, each of said pole pieces including at least one slot, an armature assembly supported for oscillation adjacent said pole pieces, means establishing a unidirectional single loop magnetic circuit of essentially constant magnitude through said pole pieces and said armature assembly, said armature assembly including magnetically isolated armature segments with center lines spaced a distance equal to the spacing of the center lines of said pole pieces and being so positioned relative to said pole pieces as to maintain a reluctance of essentially constant magnitude between the armature and the pole pieces during oscillation, and conductors in said slots with means to apply alternating current in said conductors to produce simultaneous diversion of magnetic flux from one side to the other of each of said slots to produce thrust on said armature segments simultaneously and alternately in opposite directions, said conductors comprising the sole diverting means in the magnetic circuit.

2. In combination; a stator having at least two spaced pole pieces extending therefrom with means establishing a unidirectional single loop magnetic circuit of essentially constant magnitude therebetween, means carried by said pole pieces for dividing the magnetic circuit into a plurality of separate flux paths, an armature having at least two separate magnetically isolated armature segments located in said magnetic circuit with said armature segments located adjacent respective pole pieces and positioned relative to said pole pieces so as to maintain a reluctance of essentially constant magnitude between the armature and the pole pieces during oscillation of the armature, the center lines of said armature segments being spaced a distance equal to the spacing of the center lines of said pole pieces, and means in said stator positioned between the flux paths for diverting the flux from one to the other of said plurality of flux paths simultaneously in said pole pieces to apply thrust on said armature segments simultaneously and alternately in opposite directions to produce oscillation of the armature.

3. In combination; a first stator member having first spaced pole pieces extending therefrom, a second stator member spaced from said first stator member and having second spaced pole pieces extending therefrom with air gaps between said first and second pole pieces, each of said pole pieces including at least one slot forming spaced teeth thereon, an armature assembly supported for oscillation in said air gaps, means establishing a unidirectional single loop magnetic circuit of essentially constant magnitude through said pole pieces, said armature assembly including magnetically isolated armature segments each having a width in increments of one stator pole tooth pitch and with center lines being spaced a distance equal to the spacing of the center lines of adjacent aligned first and second pole pieces and being so positioned relative to said pole pieces as to maintain a reluctance of essentially constant magnitude between the armature and the pole pieces during oscillation, and conductors passing through the slots of the spaced pole pieces of each stator member forming first and second energizing coils for said first and second stator members respectively with means to apply alternating current in said conductors to produce a simultaneous diversion of magnetic flux from one side to the other of each of said slots to produce thrust on said armature segments simultaneously and alternately in opposite directions.

4. An oscillating motor comprising; a stator frame, a first pair of parallel pole pieces mounted in said stator frame and connected by a yoke at one end to form a first stator piece, a second U-shaped stator piece including a second pair of parallel pole pieces, means to mount said second stator piece with the poles thereof in alignment with said first pole pieces with air gaps therebetween, a slot in each of said pole pieces, a first alternating current coil in the slots in said first pair of poles, a second alternating current coil in the slots of said second pair of poles, a first direct current field coil located about one of said first poles and a second direct current field coil located about the other of said first poles for establishing a unidirectional single loop magnetic circuit of essentially constant magnitude in said pole pieces, an armature frame located in said air gaps between said pole pieces and extending beyond the ends of said stator frame, magnetically isolated armature segments carried by said armature frame with an armature segment located adjacent each of said pole pieces, the center lines of said armature segments being spaced a distance equal to the spacing of the center lines of said aligned pole pieces, a support frame connected to each end of said armature frame, and spring suspension means connected between said support frame and said stator frame for supporting said armature frame for linear oscillation at mechanical resonance and maintaining said armature frame and segments centered between said pole pieces, said armature being so positioned relative to said pole pieces as to maintain a reluctance of essentially constant magnitude between the armature and the pole pieces during oscillation, whereby alternating current applied to said alternating current coil will divert magnetic flux from one side to the other of each of said slots simultaneously to produce a thrust on said armature segments simultaneously and alternately in opposite directions.

5. An oscillating motor comprising in combination; a stator frame, two stator pieces carried by said stator frame in fixed spaced relation, each of said stator pieces including at least two parallel pole pieces, with the pole pieces on said stator pieces being in alignment with air gaps therebetween, means for establishing a unidirectional single loop magnetic circuit of essentially constant magnitude through said stator pieces, means carried by said pole pieces for dividing the magnetic circuit into a plurality of separate flux paths in said pole pieces, an armature frame having magnetically isolated armature segments located in said magnetic circuit with said armature segments located in the air gaps between aligned pole pieces, the center lines of said armature segments being spaced a distance equal to the spacing of the center lines of said pole pieces, said armature frame extending beyond the sides of said stator frame, spring suspension means connected between said armature frames and said stator frame for supporting said armature frame for linear oscillation at mechanical resonance, said armature being so positioned relative to said pole pieces as to maintain a reluctance of essentially constant magnitude between the armature and the pole pieces during oscillation, and means for shifting the flux between said flux paths simultaneously in said pole pieces to apply thrust on said armature segments simultaneously and alternately in opposite directions.

References Cited

UNITED STATES PATENTS

| | | | |
|---|---|---|---|
| 1,991,952 | 2/1935 | Murphy | 318—124 |
| 2,471,729 | 5/1949 | Diebold | 310—29 |
| 2,668,251 | 2/1954 | List | 310—28 |
| 2,769,103 | 10/1956 | Kristiansen | 310—30 |
| 3,067,378 | 12/1962 | Paynter | 321—45 X |
| 3,119,940 | 1/1964 | Pettit et al. | 310—24 |

OTHER REFERENCES

IBM Techanical Disclosure Bulletin; vol. 6, No. 9, February 1964; pp. 19–20.

MILTON O. HIRSHFIELD, *Primary Examiner.*

D. F. DUGGAN, *Assistant Examiner.*